(12) United States Patent
Boyer

(10) Patent No.: US 9,027,591 B2
(45) Date of Patent: May 12, 2015

(54) GAS PRESSURE REGULATOR WITH PARTICLE TRAP AND DIFFUSER

(75) Inventor: Robert A. Boyer, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 529 days.

(21) Appl. No.: 12/582,970

(22) Filed: Oct. 21, 2009

(65) Prior Publication Data
US 2011/0088793 A1    Apr. 21, 2011

(51) Int. Cl.
*G05D 16/04*    (2006.01)

(52) U.S. Cl.
CPC ........ *G05D 16/04* (2013.01); *F17C 2201/0109* (2013.01); *F17C 2205/0308* (2013.01); *F17C 2205/0323* (2013.01); *F17C 2205/0332* (2013.01); *F17C 2205/0338* (2013.01); *F17C 2205/0382* (2013.01); *F17C 2205/0385* (2013.01); *F17C 2205/0394* (2013.01); *F17C 2221/011* (2013.01); *F17C 2223/0123* (2013.01); *F17C 2223/035* (2013.01); *F17C 2250/043* (2013.01); *F17C 2250/0491* (2013.01); *F17C 2260/044* (2013.01); *F17C 2270/05* (2013.01)

(58) Field of Classification Search
CPC ... G05D 16/04; G05D 16/06; G05D 16/0608; G05D 16/063; G05D 16/0638; F17C 2205/0338
USPC ............... 137/505.14, 505.38, 505.39, 505.4, 137/505.41, 505.42, 505.43, 505.44, 137/505.45, 505.46, 546
See application file for complete search history.

(56) References Cited

U.S. PATENT DOCUMENTS

| 2,265,888 | A | * | 12/1941 | Beck | 137/544 |
| 2,519,805 | A | * | 8/1950 | Wilkins | 137/505 |
| 3,859,205 | A | | 1/1975 | Reba et al. | |
| 4,476,887 | A | * | 10/1984 | Sumiya | 137/56 |
| 5,266,089 | A | | 11/1993 | Blocker | |
| 5,333,637 | A | | 8/1994 | Gravel | |
| 6,554,022 | B2 | * | 4/2003 | Wakeman | 137/505.42 |
| 2003/0167852 | A1 | | 9/2003 | Traverso | |

(Continued)

FOREIGN PATENT DOCUMENTS

| EP | 0132174 | 10/1988 |
| EP | 0438251 | 7/1991 |

(Continued)

OTHER PUBLICATIONS

PCT/US2010/0053335 International Search Report.

*Primary Examiner* — William McCalister
(74) *Attorney, Agent, or Firm* — Kacvinsky Daisak Bluni Pllc

(57) ABSTRACT

A gas pressure regulator for use with gas delivery systems is provided. The gas pressure regulator includes, in one form, an inlet with an entry portion and a bottom portion. A pocket is disposed proximate the bottom portion of the inlet, and a cavity is disposed within a central portion of the gas pressure regulator. A guide is disposed within a lower portion of the cavity, and a flow of gas through the gas pressure regulator extends through the inlet, changes direction to flow through the cavity, and the flow of gas changes direction to impact the guide prior to flowing through the cavity. The pocket and the guide reduce the amount of particles capable of reaching internal components of the gas pressure regulator, resulting in low sensitivity and high fault tolerance to ignited particles coming through the gas pressure regulator in the event of accidental particle contamination.

10 Claims, 5 Drawing Sheets

(56) References Cited

U.S. PATENT DOCUMENTS

| | | |
|---|---|---|
| 2005/0109403 A1 | 5/2005 | Gotthelf |
| 2005/0150828 A1 | 7/2005 | Vandrak |
| 2005/0238555 A1 | 10/2005 | Zaiser et al. |
| 2005/0274418 A1* | 12/2005 | Chen ........................ 137/505.42 |
| 2006/0225388 A1 | 10/2006 | Neff et al. |
| 2008/0308181 A1 | 12/2008 | Denis |

FOREIGN PATENT DOCUMENTS

| | | |
|---|---|---|
| EP | 95850054.8 | 10/1995 |
| GB | 181079 | 6/1922 |

\* cited by examiner

GAS PRESSURE REGULATOR WITH PARTICLE TRAP AND DIFFUSER

FIELD

The present disclosure relates to gas pressure regulators, and in particular, gas pressure regulators for use with liquid or compressed gas cylinders such as, by way of example, gas pressure regulators for oxy-fuel cutting applications.

BACKGROUND

The statements in this section merely provide background information related to the present disclosure and may not constitute prior art.

Gas pressure regulators are employed in a variety of applications in order to reduce and adjust the pressure of gases provided from gas cylinders to downstream equipment. In one common application, oxy-fuel cutting, two gas cylinders are present, one for acetylene gas and another for oxygen gas. As shown in FIG. 1, a gas pressure regulator 1 is secured to the top of a gas cylinder 2, (only one gas pressure regulator and one gas cylinder are shown), which is controlled by an operator in order to properly adjust the pressure of gases for ignition and subsequent cutting. These conventional gas pressure regulators 1 include a cylinder pressure gauge 3, a line pressure gauge 4, and a line pressure adjustment knob 5. Additionally, a cylinder valve knob 6 is mounted to the gas cylinder 2 to open and close the flow of gas from the gas cylinder 2 to the gas pressure regulator 1. The gas pressure regulator 1 also includes other features such as a relief valve 7 and outlet 8 as shown. With these conventional gas pressure regulators 1 and the means by which they are mounted to the gas cylinder 2, there are several locations that are susceptible to damage, as shown, if the gas cylinder 2 were, for example, to fall over or be mishandled during operation.

These conventional gas pressure regulators have also maintained substantially the same design for decades, yet have carried their overall bulky character and lack of robustness and ergonomic features over time. Improved gas pressure regulators that are safer, easier to use, provide a more compact package to the end user, and which aid in fault tolerance are continually desirable in the art of gas regulation, particularly regulation of combustible or flammable compressed gas stored in gas cylinders, including gas cylinders for oxy fuel cutting.

SUMMARY

In one form of the present disclosure, a gas pressure regulator is provided that comprises a body defining a proximal end portion, a distal end portion, and a central portion having a longitudinal axis extending therethrough. An inlet is disposed proximate the distal end portion of the body, the inlet defining an inlet axis extending therethrough, the inlet having an entry portion and a bottom portion, and the inlet axis being offset from the longitudinal axis. A pocket is disposed proximate the bottom portion of the inlet and centrally aligned with the inlet axis, a cavity is disposed within the central portion of the body and defining an upper portion and a lower portion, the cavity centrally aligned with the longitudinal axis, a channel extends between the inlet and the cavity, and a guide is disposed within the lower portion of the cavity. A flow of gas through the gas pressure regulator extends through the inlet, changes direction to flow through the channel, and changes direction again to flow through the cavity, and the flow of gas changes direction to go through the channel prior to reaching the pocket and impacts the guide prior to changing direction to flow through the cavity.

In another form, a gas pressure regulator is provided that comprise a body defining a proximal end portion, a distal end portion, and a central portion having a longitudinal axis extending therethrough. An inlet is disposed proximate the distal end portion of the body, the inlet defining an inlet axis extending therethrough, the inlet having an entry portion and a bottom portion, and the inlet axis being offset from the longitudinal axis. A pocket is disposed proximate the bottom portion of the inlet and centrally aligned with the inlet axis, the pocket disposed directly in-line with a flow of gas entering the gas pressure regulator, a cavity is disposed within the central portion of the body and defining an upper portion and a lower portion, the cavity centrally aligned with the longitudinal axis, and a channel extends between the inlet and the cavity. A flow path of the gas extends through the inlet, through the channel, and through the cavity, and the flow path changes direction to go through the channel prior to reaching the pocket.

In still another form, a gas pressure regulator is provided that comprises a body defining a proximal end portion, a distal end portion, and a central portion having a longitudinal axis extending therethrough. An inlet is disposed proximate the distal end portion of the body, the inlet defining an inlet axis extending therethrough, the inlet axis being offset from the longitudinal axis. A cavity is disposed within the central portion of the body and defining an upper portion and a lower portion, the cavity centrally aligned with the longitudinal axis, a channel extends between the inlet and the cavity, and a guide is disposed within the lower portion of the cavity. A flow of gas through the gas pressure regulator extends through the inlet, changes direction to flow through the channel, and changes direction again to flow through the cavity, and the flow of gas impacts the guide prior to changing direction to flow through the cavity.

According to a method of the present disclosure, a gas pressure regulator provides a flow of gas through an inlet, changes the direction of the flow of gas to flow through a channel, and changes the direction of the flow of gas again to flow through a cavity, wherein the flow of gas changes direction to go through the channel prior to reaching a particle trap and impacts a diffuser prior to changing direction to flow through the cavity.

In another form, a gas pressure regulator is provided that comprises a body defining a proximal end portion, a distal end portion, and a central portion having a lateral axis extending therethrough. An inlet is disposed proximate the distal end portion of the body, the inlet defining an inlet axis extending therethrough, the inlet having an entry portion and a bottom portion, and the inlet axis being oriented at an angle from the lateral axis. A pocket is disposed proximate the bottom portion of the inlet and centrally aligned with the inlet axis, a cavity is disposed within the central portion of the body and defining an upper portion and a lower portion, the cavity centrally aligned with the lateral axis, and a guide is disposed within the lower portion of the cavity. A flow of gas through the gas pressure regulator extends through the inlet, and changes direction to flow through the cavity, and the flow of gas impacts the guide prior to flowing through the cavity.

In another form of the present disclosure, a method of operating a gas pressure regulator is provided that comprises providing a flow of gas through an inlet, and changing the direction of the flow of gas to flow through a cavity, wherein the flow of gas changes direction to go through the cavity prior to reaching a particle trap and impacts a diffuser prior to flowing through the cavity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1. is a front view of a prior art gas pressure regulator mounted to a gas cylinder;

Figure 1:
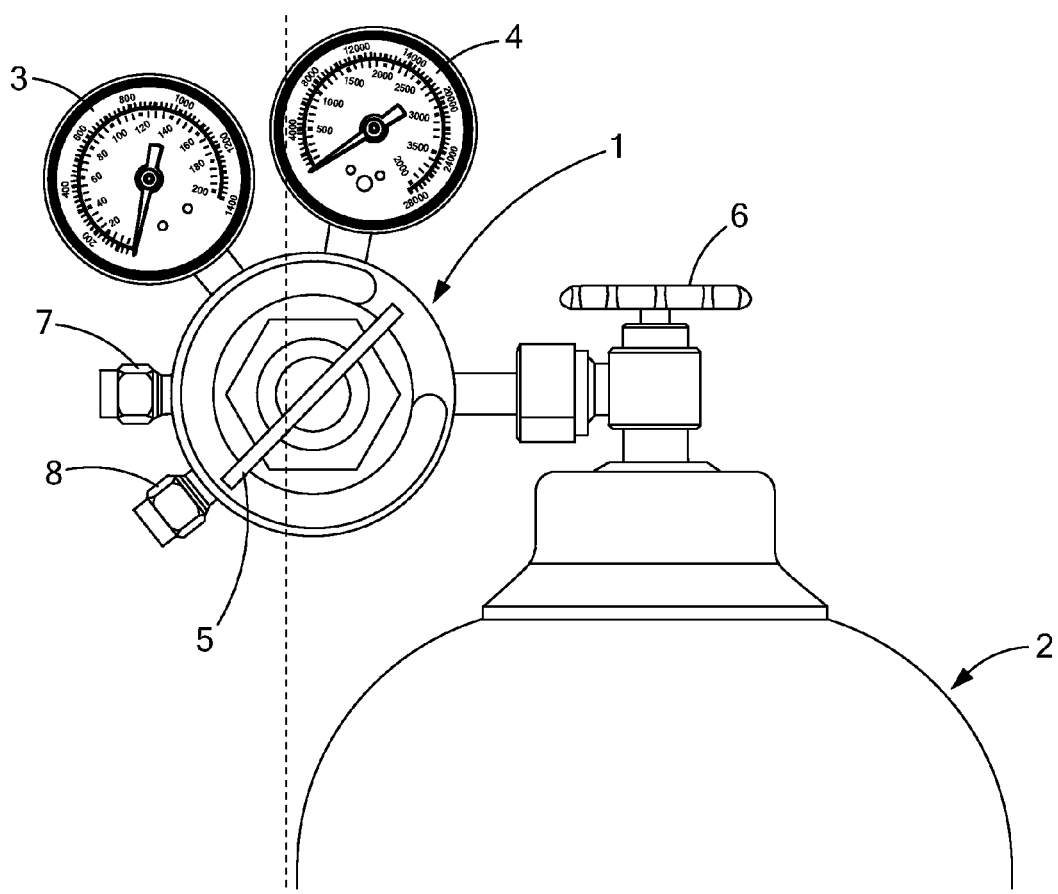

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to FIGS. 2, 3, and 4a-b, a gas pressure regulator in accordance with the teachings of the present disclosure is illustrated and generally indicated by reference numeral 20. The gas pressure regulator 20 comprises a body 22 defining a front portion 24, a proximal end portion 28 and an opposing distal end portion 26, and a central portion 25 between the proximal and distal end portions 28 and 26. A first gas pressure indicator 30, in the form of an analog gauge in one form of the present disclosure, is mounted to a lower end 32 of the front portion 24 of the body 22. A second gas pressure indicator 40, also in the form of an analog gauge in this form of the present disclosure, is mounted to an upper end 42 of the front portion 24 of the body 22. As shown, the first gas pressure indicator 30 and the second gas pressure indicator 40 are advantageously stacked in a vertical configuration and off to the side relative to a gas cylinder 2 (shown dashed lines). It should be understood that the gas cylinder 2 is merely exemplary of a variety of gas delivery systems in which the gas pressure regulator 20 according to the present disclosure may be employed. For example, other gas delivery systems may include gaslines or gas stations. As such, the gas pressure regulator 20 as set forth herein has applicability to a variety of gas delivery systems and not merely gas cylinders. Moreover, the "gas" cylinder 2 should not be construed as being limited to compressed gas only, but may also include liquids and other forms of fluids while remaining within the scope of the present disclosure.

As further shown, a pressure adjustment knob 50 is mounted to the proximal portion 28 of the body 22. In this form, the gas pressure regulator 20 is mounted on a gas cylinder 2 such that the pressure adjustment knob 50 extends horizontally relative to a longitudinal axis X of the gas cylinder 2. Further, the pressure adjustment knob 50 in one form comprises a textured outer surface for ease of use/grip, which are in the form of ribs 52 and scallops 54 as shown.

Figure 2:
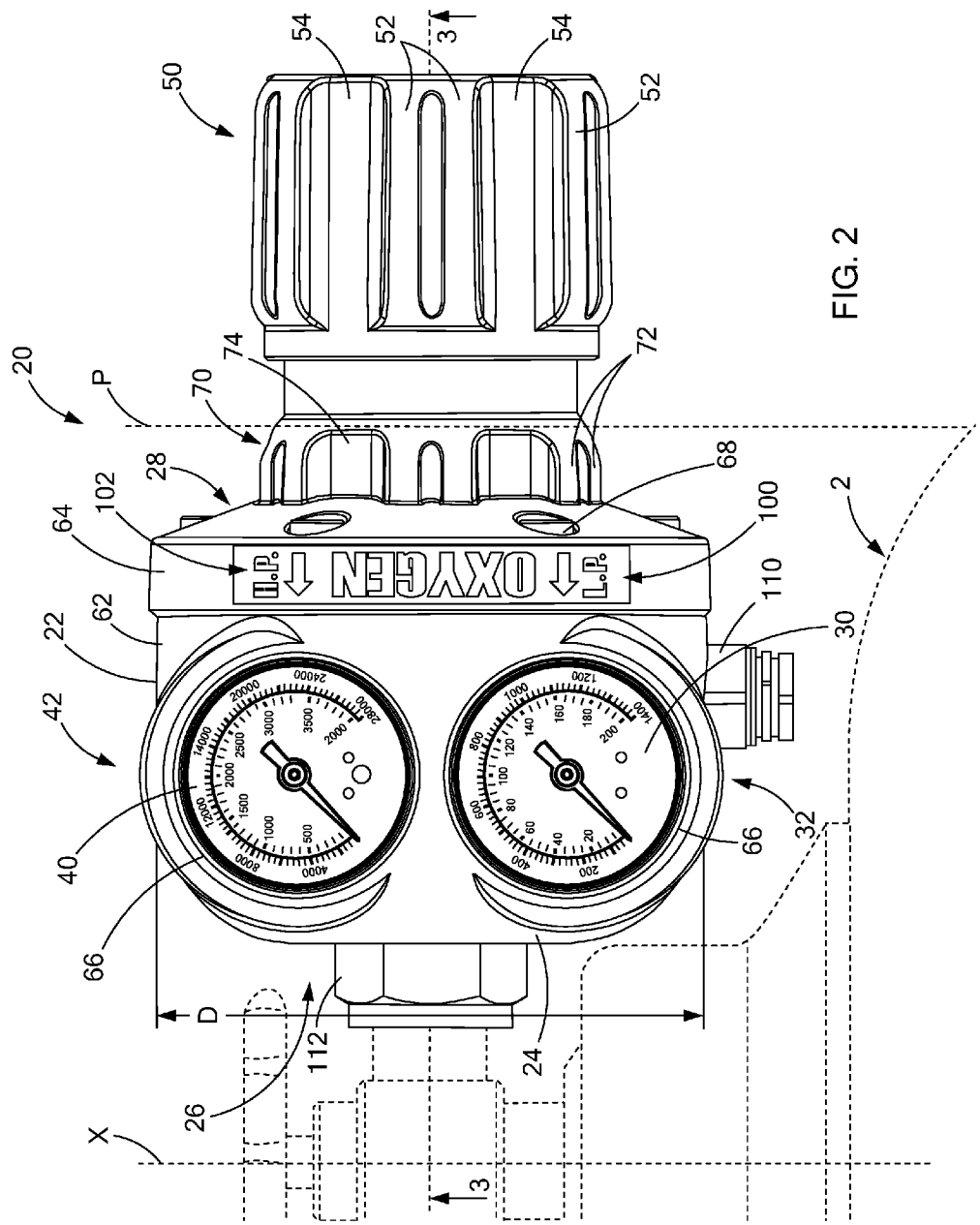
FIG. 2 is a front view of a gas pressure regulator in accordance with the teachings of the present disclosure.

As also shown in FIG. 2, elements of the gas pressure regulator 20 are disposed within, (or a substantial portion of the elements of the gas pressure regulator 20 are disposed within), the outer profile P, or an extension of the outer wall of the gas cylinder 2, which reduces the number of impact points on the gas pressure regulator 20 should the gas cylinder 2 fall over or be mishandled during use. Generally, the elements disposed within the profile P are those which affect the ability to maintain system pressure or integrity. Therefore, the gas pressure regulator 20 is compact and more robust than traditional gas pressure regulators in the art. Additional robust features of the gas pressure regulator 20 are described in greater detail below.

As further shown, the gas pressure regulator 20 also comprises a body guard 62 and a bonnet 64. It should be understood that although two separate pieces are shown for the body guard 62 and the bonnet 64, these two components may alternately be a single, unitized piece, or be multiple pieces while falling within the scope of the present disclosure. The bonnet 64 in one form is a zinc-aluminum alloy and replaces traditional brass materials, and the body guard 62 in one form is a medium impact ABS (acrylonitrile butadiene styrene). However, it should be understood that other materials, including brass, that are robust and can withstand impact damage during operation may also be employed while remaining within the scope of the present disclosure.

Referring to the body guard 62 in FIG. 2, the contour of this body guard 62 is configured such that the pressure indicators 30 and 40 are recessed within apertures, behind ridges 66, and the front profile of the guard 62. Furthermore, the pressure indicators 30 and 40 are located within the outer diameter "D" of the bonnet 64 as best shown in FIG. 2. As such, the pressure indicators 30 and 34 are more protected from impact damage, whether or not the body guard 62 is installed onto the body 22.

The bonnet 64 in one form is fastened to the body 22 with bolts 68. As such, a shorter design profile for the gas pressure regulator 20 is achieved. It should be understood that the bonnet 64 may be secured to the body 22 using other approaches such as a snap-on design or threads, by way of example. As further shown, the bonnet 64 also includes a contoured outer surface 70 proximate the pressure adjustment knob 50, which is in the form of ribs 72 and scallops 74, similar to the pressure adjustment knob 50.

As best shown in FIG. 2, the bonnet 64 includes various indicia to provide information to the user as to where and how certain functions operate. For example, on the bonnet 64, a low pressure indicia "L.P." and arrow 100 are shown near the first gas pressure indicator 30 to indicate that this pressure indicator is for low pressure, or pressure of the gas exiting the regulator. Similarly, a high pressure indicia "H.P." and arrow 102 are shown near the second gas pressure indicator 40 to indicate that this pressure indicator is for high pressure, or pressure of the gas within the gas cylinder 2. Preferably, the pressure adjustment knob 50 also includes indicia, such as that disclosed in U.S. Provisional Patent Application Ser. No. 61/159,232, filed Mar. 11, 2009, entitled "COMPACT ROBUST GAS PRESSURE REGULATOR," the entire contents of which are incorporated herein by reference. It should be understood that other types of indicia may be provided, including but not limited to LEDs to indicate unsafe pressure levels, while remaining within the scope of the present disclosure.

As further shown in FIG. 2, the body 22 comprises a plurality of fittings 110 and 112. Fitting 110 is a safety relief valve. Fitting 112 is adapted for mounting the gas pressure regulator 20 to the gas cylinder 2. Another fitting (not shown) at the back of the body 22 provides an outlet connection, i.e. to a hose that connects to the downstream equipment. Advantageously, the outlet fitting is directed down and out the back of the gas pressure regulator body 22, which places hose-related hazards away from an operator. It should be understood that any number and/or configurations of fittings may be employed in accordance with the teachings of the present disclosure, and thus the fittings illustrated and described herein are merely exemplary and should not be construed as limiting the scope of the present disclosure.

Figure 3:
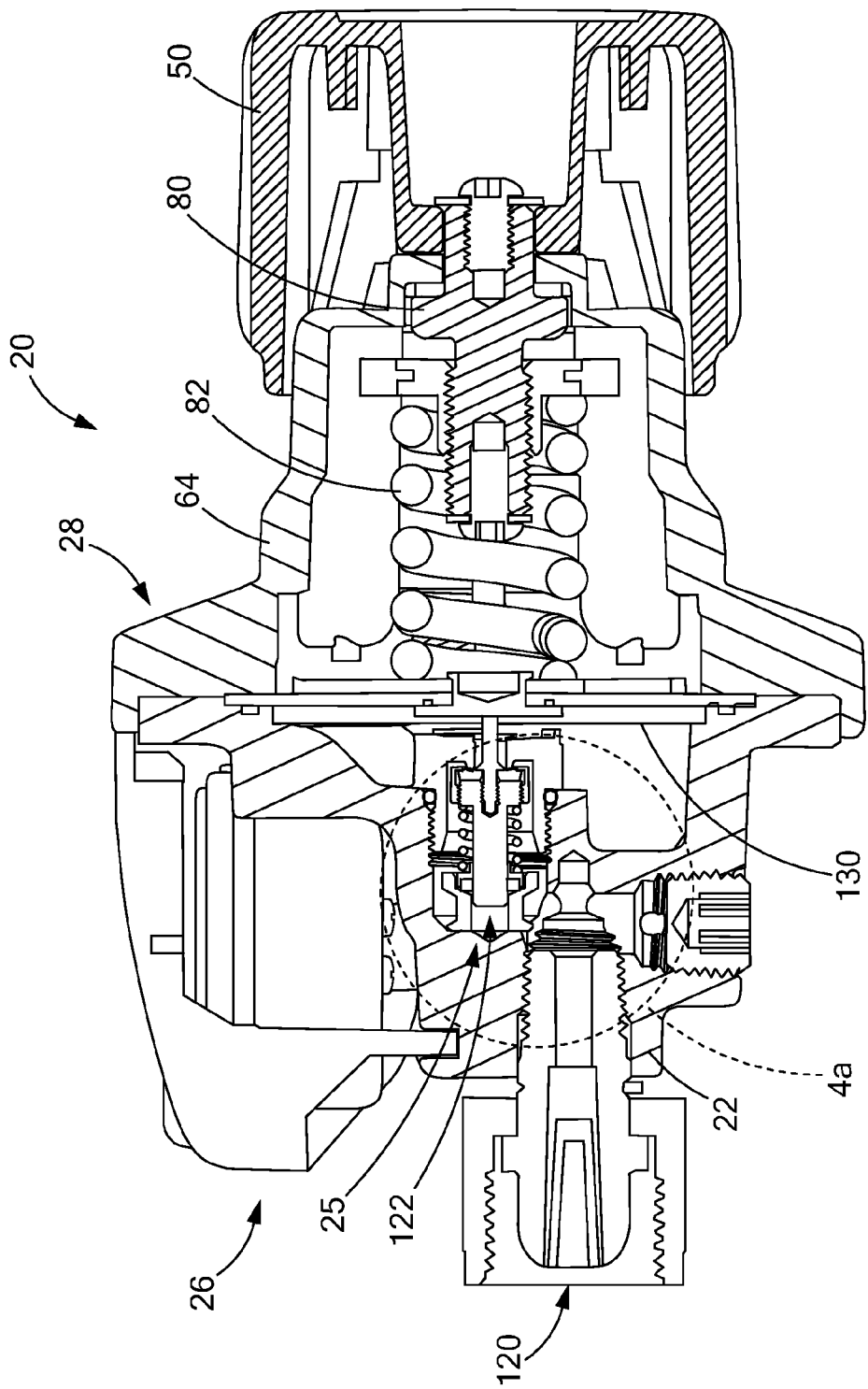
FIG. 3 is a cross-sectional view of the gas pressure regulator of FIG. 2, taken along line 3-3.

Referring now to FIG. 3, the pressure adjustment knob 50 is mounted to the body 22 by an adjustment member 80 and compression spring 82 that are disposed within the bonnet 64 as shown. The gas pressure regulator 20 may include an energy absorbing device disposed between the pressure adjustment knob 50 and the body 22 such as any of the energy absorbing devices disclosed in U.S. Provisional Patent Application Ser. No. 61/159,232, which is commonly assigned with the present application and the contents of which are incorporated herein by reference in their entirey.

As further shown in FIG. 3, inlet 120 and cavity 122 are configured to protect internal components of the gas pressure regulator 20, which is described in greater detail below. Additionally, a diaphragm 130 is provided as shown, which in one form is a high-strength fabric reinforced neoprene material for standard industrial applications. For high purity or liquid applications, a stainless steel material is employed for the diaphragm in another form of the present disclosure.

Figures 4A, 4B:
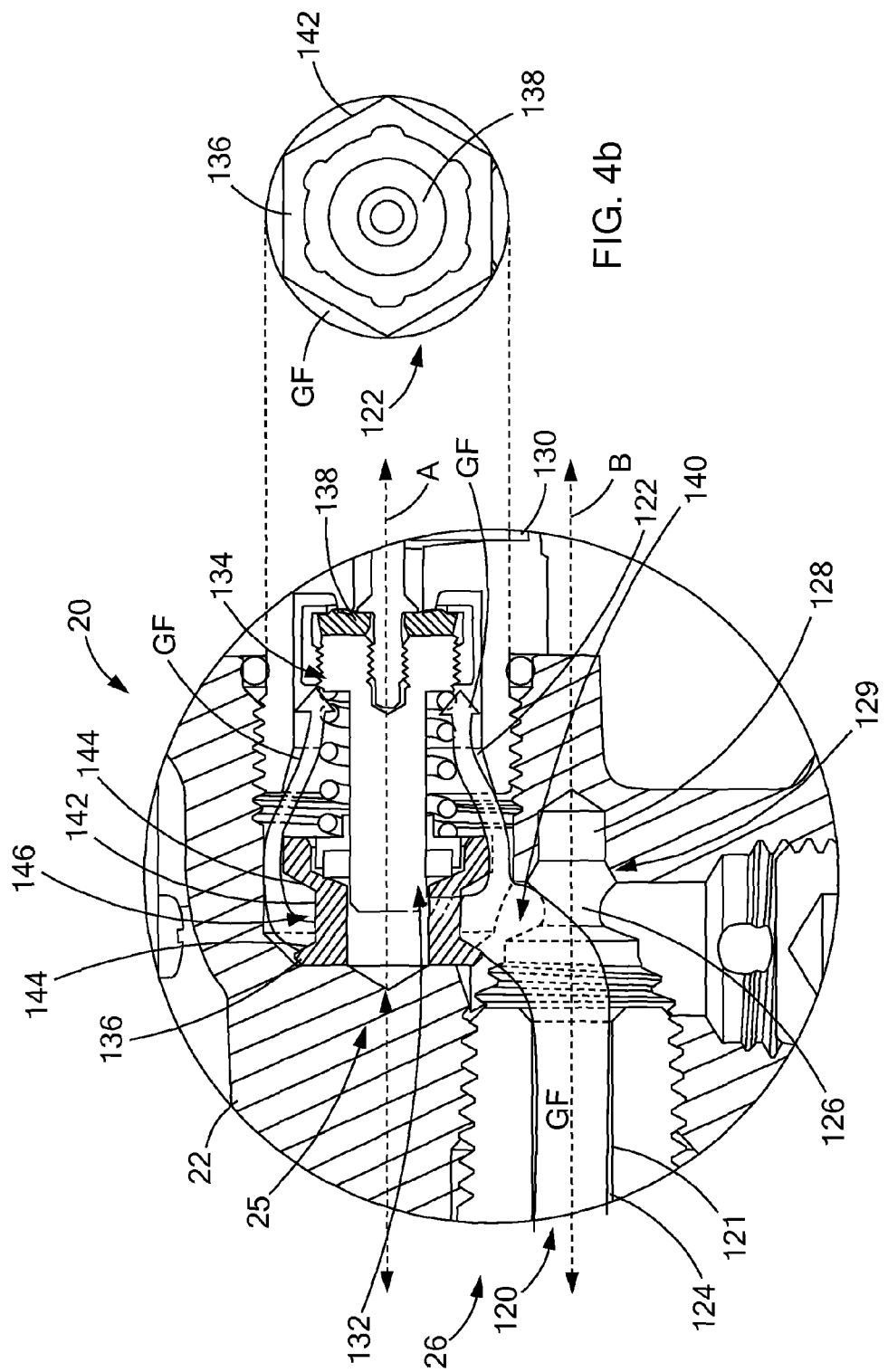
FIG. 4a is an enlarged view of circle 4a in FIG. 3.
FIG. 4b is an end view of the section taken along the lower portion of the cavity 122 of FIG. 4a, illustrating a flow of gas relative to the guide disposed within the cavity.

As best illustrated in FIG. 4a, the cavity 122 is disposed within the central portion 25 of the body 22 and the inlet 120 is disposed proximate the distal end portion 26 of the body 22. In this form, the cavity 122 is centrally aligned with and extends along a longitudinal axis A. The cavity 122 defines a lower portion 132 extending to an upper portion 134 along the longitudinal axis A.

As further shown, the inlet 120 includes an inlet bore 121 centrally aligned with and extending along an inlet axis B extending through the inlet 120. The inlet bore 121 of the inlet 120 defines an entry portion 124 extending to a bottom portion 126 along the inlet axis B.

As shown in this form of the present disclosure, the inlet axis B of the inlet 120 is offset from the longitudinal axis A of the cavity 122, and a channel 140 extends between the inlet bore 121 and the cavity 122. In this form, the inlet axis B and the longitudinal axis A are substantially parallel to one another, and the channel 140 is orthogonal to the longitudinal axis A and the inlet axis B to provide fluid communication between the inlet 120 and the cavity 122.

As depicted in FIG. 4a, a pocket 128 is disposed proximate the bottom portion 126 of the inlet 120 and is centrally aligned with the inlet axis B. The pocket 128, in this form, is disposed directly in-line with a flow of gas entering the gas pressure regulator 20 through the inlet 120. In this form, a flow of gas enters the gas pressure regulator 20 via the entry portion 124 of the inlet 120. The gas then follows a flow path, depicted in FIG. 4a by arrows GF. More specifically, the flow of gas flow goes through the inlet 120, changes direction to follow the flow path GF through the channel 140, then changes direction again to flow through the cavity 122. Advantageously, heavier contaminant particles having mass and velocity resist the direction change of the gas and instead fall into the pocket 128 at the bottom portion 126 of the inlet 120. Thus, the pocket 128 serves as a high-energy particle trap, or particle energy diffuser, where the particles become embedded or are simply stripped of their energy upon impact within the pocket 128. As shown, the pocket 128 in one form defines a tapered inlet portion 129. Additionally, the pocket 128 in this form defines a bore that is smaller in size (i.e., length and/or diameter) than the inlet bore 121.

As further illustrated in FIGS. 4a-b, a guide 136 is disposed within the lower portion 132 of the cavity 122 and a valve seat assembly 138 is disposed within the upper portion 134 of the cavity 122. In this form, the guide 136 is directly upstream of the pocket 128 and acts as a diffuser for lighter particles that are able to follow the gas flow path GF and not get trapped into the pocket 128. As shown, the guide 136 defines at least one peripheral recessed portion 142 to allow for passage of the gas. The peripheral recessed portion 142, in one form, defines a hexagonal configuration, as best illustrated in FIG. 4b. Further illustrated in FIG. 4a, the guide 136 also defines a central recessed portion 146 having canted sidewalls 144. Additionally, the guide 136 in one form is comprised of a non-combustible material.

In this form of the present disclosure, the guide 136 acts as a secondary diffuser for the lighter particles that are able to follow the gas flow path GF beyond the pocket 128 as described above. These lighter particles will impact the sides of the guide 136 and/or are divided within the gas flow stream as it passes around the guide 136, resulting in further diffusion of the particle energy of the gas flow. Together, the pocket 128 and the guide 136 reduce the amount of particles capable of reaching the seat assembly 138, and in turn the particles and/or contamination capable of entering the low-pressure cavity and exiting the regulator. The result is low sensitivity and high fault tolerance to ignited particles coming through the gas pressure regulator 20 in the event of accidental particle contamination. In addition to serving as a diffuser for lighter particles in the gas flow, the guide 136 serves as alignment feature for the seat assembly 138 and as a retainer for friction dampening.

Figure 5B:
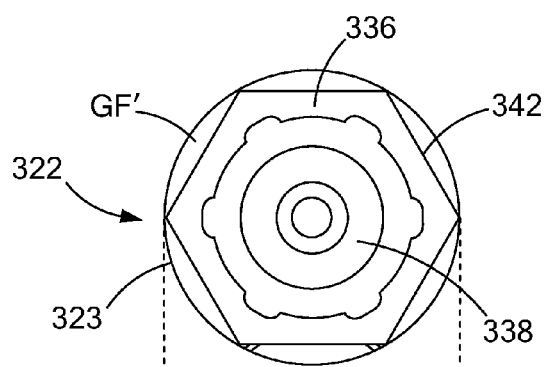
FIG. 5b is an end view of the section taken along the lower portion of the cavity 322 of FIG. 5a, illustrating a flow of gas relative to the guide disposed within the cavity.
Figure 5A:
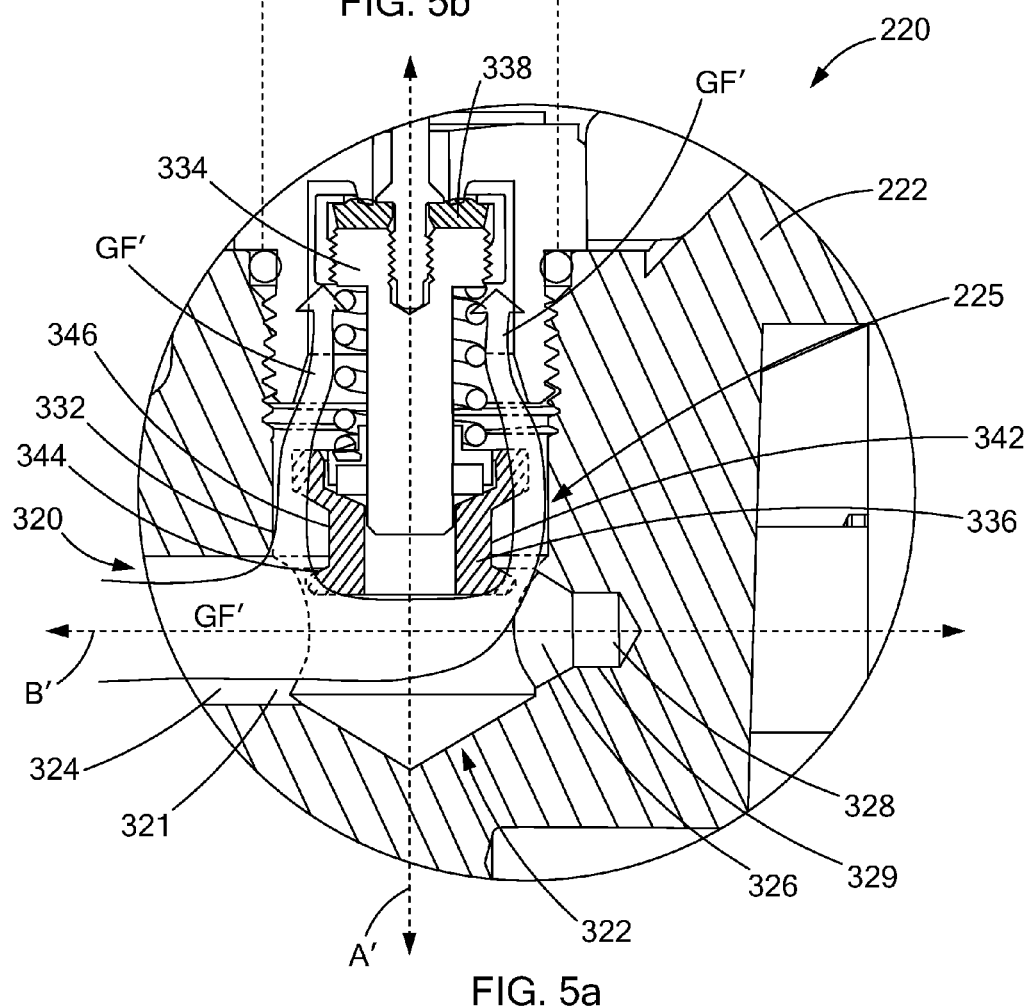
FIG. 5a is an enlarged cross-sectional view of a gas pressure regulator in accordance with further teachings of the present disclosure.

Referring now to FIG. 5a-b, another form of a gas pressure regulator including an alternate arrangement of the particle trap and guide is illustrated and generally indicated by reference numeral 220. The gas pressure regulator 220 is similar to that in FIGS. 4a-b, wherein similar components are denoted by similar reference numerals increased by 200. As shown in FIGS. 5a-b, inlet 320 and cavity 322 include certain features to protect the internal components of the gas pressure regulator 220 as set forth in greater detail below. Additionally, a diaphragm 330 is provided as shown.

As shown, the cavity 322 is disposed within the central portion 225 of the body 222 and the inlet 320 is disposed proximate the distal end portion 226 of the body 222. In this form, the cavity 322 is centrally aligned with and extends along a lateral axis A'. The cavity 322 defines a lower portion 332 extending to an upper portion 334 along the longitudinal axis A'.

The inlet 320 includes an inlet bore 321 centrally aligned with and extending along an inlet axis B' extending through the inlet 320. The inlet bore 321 of the inlet 320 defines an entry portion 324 extending to a bottom portion 326 along the inlet axis B'.

In this form of the present disclosure, the inlet axis B' of the inlet 320 and the lateral axis A' of the cavity 322 intersect one another at about a right angle. Thus, the inlet 320 and the cavity 322 are substantially perpendicular to one another such that the cavity 322 is in direct fluid communication with the inlet, i.e., there is no channel extending between the inlet 320 and the cavity 322 in this arrangement.

As depicted in FIG. 5a, a pocket 328 is disposed proximate the bottom portion 326 of the inlet 320 and is centrally aligned with the inlet axis B'. The pocket 328 is disposed directly in-line with a flow of gas entering the gas pressure regulator 220. In this form, a flow of gas enters the gas pressure regulator 220 via the entry portion 324 of the inlet 320. The gas follows a flow path, depicted by arrows GF', wherein the gas flow has to change direction to follow the path GF' from the inlet 320 and orthogonally into the cavity 322. In this form, the gas flow travels through the inlet bore 321 along the inlet axis B' and changes direction to follow the flow path GF' into the cavity 322. Advantageously, heavier contaminant particles having mass and velocity resist direction change and instead fall into the pocket 328 at the bottom portion 326 of the inlet 320. Thus, the pocket 328 serves as a high-energy particle trap, or particle energy diffuser, where the particles become embedded or are simply stripped of their energy upon impact within the pocket 328. As shown in FIG. 5a, the pocket 328 in one form defines a tapered inlet portion 329. As further shown, the pocket 328 defines a cylindrical bore that is smaller in size (i.e., length and/or diameter) than the inlet bore 321.

As further illustrated in FIGS. 5a-b, a guide 336 is disposed within the lower portion 332 of the cavity 322, and a valve seat assembly 338 is disposed within the upper portion 334 of the cavity 322. In this form, the guide 336 acts as a diffuser for the lighter particles that are able to follow the gas flow path GF' past the pocket 328. As shown, the guide 336 defines at least one peripheral recessed portion 342 to allow for the passage of gas. The peripheral recessed portion 342 preferably defines a hexagonal configuration, as best illustrated in FIG. 5b. Further illustrated in FIG. 5b, the guide 336 preferably defines a central recessed portion 346 having canted sidewalls 344. In one form, the guide 336 is comprised of a non-combustible material.

In this form, the guide 336 acts as a secondary diffuser for the lighter particles that are able to follow the gas flow path GF' past the pocket 328. These lighter particles impact the sides of the guide 336 and/or are divided within the gas flow as it flows past the guide 336, resulting in further diffusion of the particles and their energy in the gas flow. Together, the pocket 328 and the guide 336 reduce the amount of particles/ energy capable of reaching the seat assembly 338, and in turn the particles/energy capable of entering the low-pressure cavity and exiting the regulator. The result is low sensitivity and high fault tolerance to ignited particles coming through the gas pressure regulator 220 in the event of accidental particle contamination. In addition to serving as a diffuser for incoming gas flow stream, the guide 336 serves as an alignment feature for the seat assembly 338 and as a retainer for friction dampening.

It is noted that various forms of the present disclosure may be provided in accordance with the teachings of the present disclosure, including but not limited to, a gas pressure regulator having a pocket/particle trap and a guide/diffuser, a pocket/particle trap only without a guide/diffuser, or a guide/ diffuser only without a pocket/particle trap. Further, it is within the scope of the present disclosure for the axes B and A of respective inlet 120 and body 22 to be aligned at an angle other than parallel as illustrated herein, and it is also within the scope of the present disclosure for the axes B' and A' of the alternate form shown in FIGS. 5a-b to be aligned at an angle other than orthogonal as illustrated herein. Furthermore, the axes B and A may be parallel to one another, in which case a channel extends therebetween to provide fluid communication between the inlet 120 and cavity 122, or they may intersect at an angle, in which case they are in direct fluid communication with one another.

The present disclosure further provides a method of operating a gas pressure regulator. Referring to the form illustrated in FIGS. 3 and 4a-b, the method of operating the gas pressure regulator comprises providing a flow of gas through an inlet, changing the direction of the flow of gas to flow through a channel, and changing the direction of the flow of gas again to flow through a channel. In this form, the flow of gas changes direction to go through the channel prior to reaching a pocket, or particle trap, and impacts a guide, or diffuser, prior to changing direction to flow through the channel.

Alternatively, referring to the form illustrated in FIGS. 5a-b, the method of operating the gas pressure regulator comprises providing a flow of gas through an inlet and changing the direction of the flow of gas to flow through a guide. In this form, the flow of gas changes direction to go through the guide prior to reaching a pocket, or particle trap, and impacts a guide, or diffuser, prior to flowing through the channel.

It should be noted that the disclosure is not limited to the various forms described and illustrated as examples. For example, the gas pressure regulator according to the teachings of the present disclosure is not limited to oxy-fuel cutting applications and may be employed in other applications that could reap the benefits of the unique designs disclosed hereunder. Moreover, the gas pressure regulator according to the teachings of the present disclosure is not limited to the arrangements disclosed herein. Modifications as well as any replacement by technical equivalents may be added to the description and figures, without leaving the scope of the protection of the disclosure and of the present patent.

What is claimed is:

1. A gas pressure regulator comprising:
   a body defining a proximal end portion, a distal end portion, and a central portion having a longitudinal axis extending therethrough;
   an inlet disposed proximate the distal end portion of the body, the inlet defining an inlet axis extending therethrough, the inlet having an entry portion and a bottom portion, and the inlet axis being offset from the longitudinal axis;
   a pocket integrally formed in the body and disposed proximate the bottom portion of the inlet and centrally aligned with the inlet axis, wherein the pocket is in communication with the inlet via a tapered inlet portion of an opening of the pocket, the tapered inlet portion reducing the inlet to the opening having a diameter less than the diameter of the entry portion of the inlet;
   a cavity disposed within the central portion of the body and defining an upper portion and a lower portion, the cavity centrally aligned with the longitudinal axis;
   a channel extending between the inlet and the cavity; and
   a guide disposed within the lower portion of the cavity and the guide defines an exterior surface,
   wherein a flow of gas through the gas pressure regulator extends through the inlet and flows in a first direction, the first direction extending into the pocket, the flow then changes direction to flow through the channel in a second direction, and changes direction again to flow through the cavity, and the flow of gas changes direction to go through the channel before reaching the pocket and impacts the guide and flows around the exterior surface of the guide and along the exterior surface, prior to changing direction to flow through the cavity, and wherein a total angular change in flow direction of the flow of gas from the first direction to the second direction relative to the first direction is less than or equal to 90°.

2. The gas pressure regulator according to claim 1 further comprising a valve seat assembly disposed within the cavity.

3. The gas pressure regulator according to claim 1, wherein the guide defines at least one peripheral recessed portion to allow for passage of the gas.

4. The gas pressure regulator according to claim 3, wherein the peripheral recessed portion defines a hexagonal configuration.

5. The gas pressure regulator according to claim 1, wherein the guide defines a central recessed portion having canted sidewalls.

6. The gas pressure regulator according to claim 1, wherein the guide comprises a non-combustible material.

7. The gas pressure regulator according to claim 1, wherein the pocket defines a tapered inlet portion.

8. The gas pressure regulator according to claim 1, wherein the channel is orthogonal to the longitudinal axis and the inlet axis.

9. The gas pressure regulator according to claim 1, wherein the bottom portion defines a reduced diameter relative to the entry portion of the inlet and extending from the inlet along the inlet axis.

10. The gas pressure regulator according to claim 7, wherein the pocket further defines a cylindrical section having a length along the inlet axis and extending from the tapered inlet portion and opening.

\* \* \* \* \*